Figure 5:
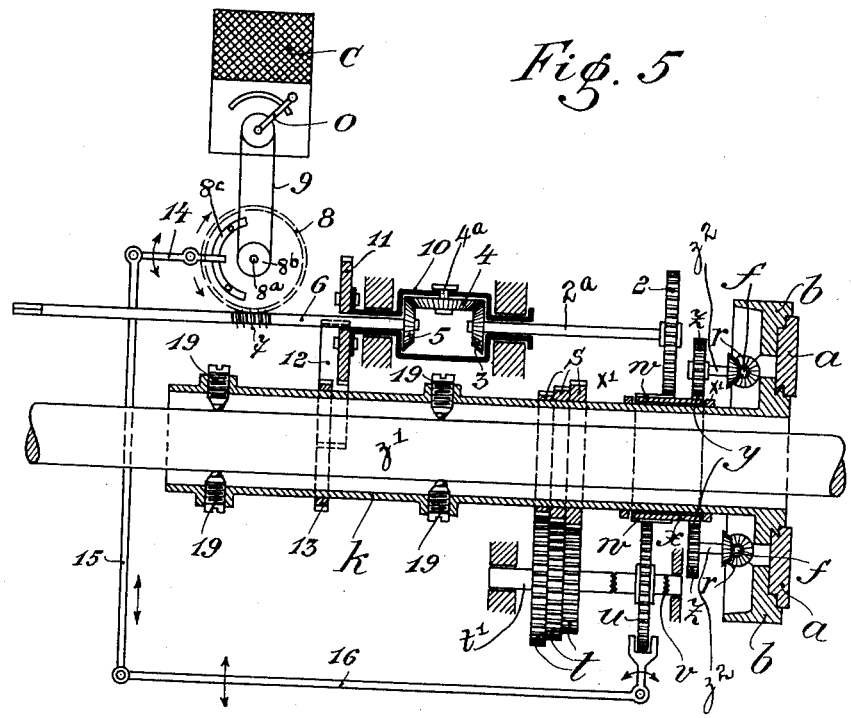

H. G. KRAUSS.
LATHE OR SIMILAR CUTTING MACHINE.
APPLICATION FILED NOV. 29, 1913.
1,100,747.
Patented June 23, 1914.
2 SHEETS—SHEET 1.
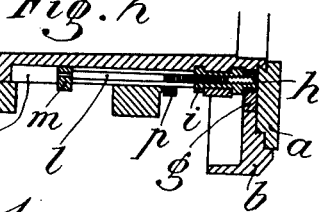
Fig. 2
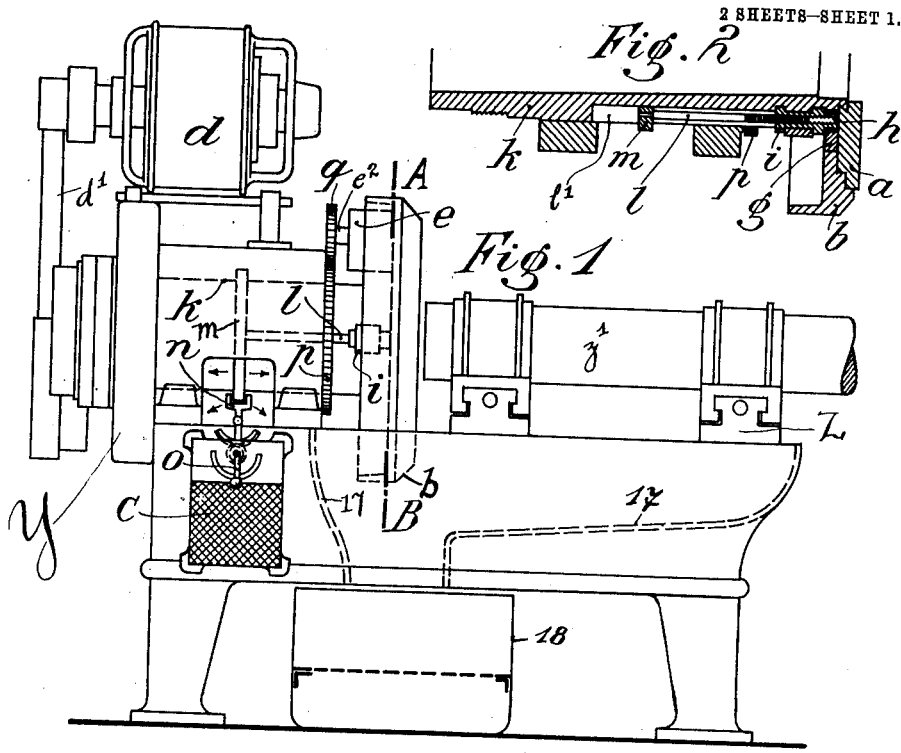
Fig. 1
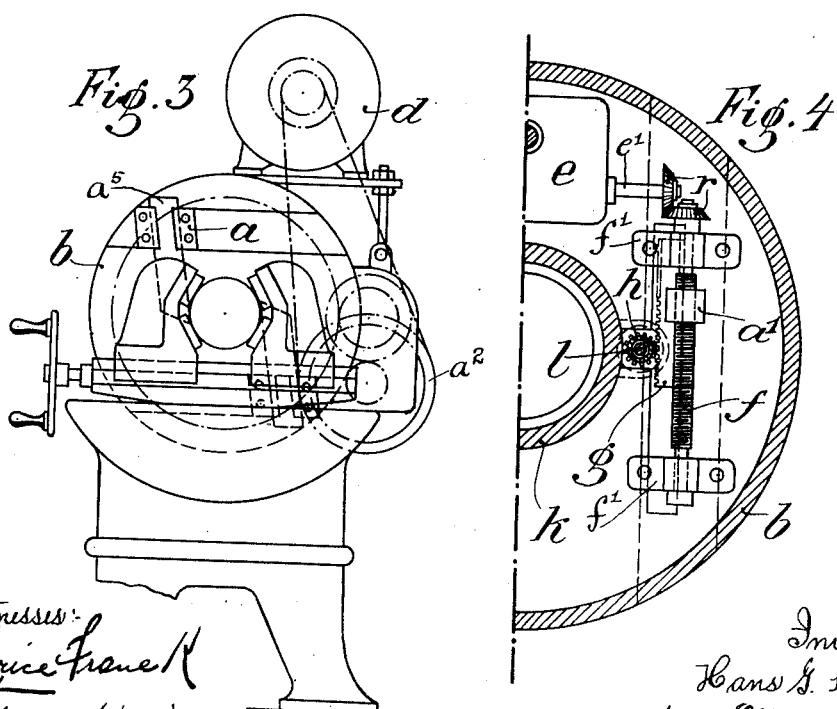
Fig. 3
Fig. 4
Witnesses:
Inventor
Hans G. Krauss
by his Attorney

H. G. KRAUSS.
LATHE OR SIMILAR CUTTING MACHINE.
APPLICATION FILED NOV. 29, 1913.

1,100,747.

Patented June 23, 1914.
2 SHEETS—SHEET 2.

Witnesses:

Inventor
Hans G. Krauss
by his Attorney

UNITED STATES PATENT OFFICE.

HANS G. KRAUSS, OF MUNICH, GERMANY, ASSIGNOR TO THE FIRM OF J. A. MAFFEI, OF MUNICH-HIRSCHAU, GERMANY.

LATHE OR SIMILAR CUTTING-MACHINE.

1,100,747.  Specification of Letters Patent.  Patented June 23, 1914.

Application filed November 29, 1913. Serial No. 803,659.

*To all whom it may concern:*

Be it known that I, HANS G. KRAUSS, a subject of the German Emperor, residing at Munich, Germany, have invented certain new and useful Improvements in Lathes or Similar Cutting-Machines, of which the following is a specification.

My invention relates to lathes or similar cutting machines, having a rotary cutter head in which the cutting tool is given a feeding or traversing movement.

One object of the invention is to provide automatically operating means by which the cutting speed of the tool is maintained constant throughout the cutting operation.

A further object is to so construct and arrange the parts of the mechanism, that the requisite variation in speed of rotation of the cutter head is made directly dependent upon the extent of feeding or traversing movement of the cutter.

Another object of the invention is to generally simplify and improve the construction and operation of machines of this character, and other objects and advantages of the invention will more fully hereinafter appear.

The invention comprises the several novel features of construction, and combinations of parts about to be described, and particularly specified in the appended claims.

I have shown two forms of the invention in the accompanying drawings, wherein—

Figure 1 is a side elevational view of a lathe embodying my invention; Fig. 2 is a partial, horizontal, axial section through the cutter head and headstock shaft; Fig. 3 is an end elevation; Fig. 4 is one half of a vertical sectional view taken on the line A—B of Fig. 1; and Fig. 5 is a longitudinal, horizontal section, with parts in elevation, of a modified form of the invention.

Referring by reference characters to the drawings and particularly to Figs. 1 to 4 thereof, Y denotes generally the headstock of the lathe and Z the support in which the work piece $z'$ is held. The headstock Y carries a cutter head $b$ in which a screw spindle $f$ is suitably supported by the brackets $f'$. Slidably mounted in the head $b$ is a tool carriage $a$ carrying an adjustable cutting tool $a^5$. The carriage $a$ is suitably connected to an internally threaded nut $a'$ which engages the threaded spindle $f$ and is adapted to travel along the same.

Supported within the cutter head $b$ is a gear box $e$ containing any approved form of differential speed gearing (not shown). By means of bevel gearing $r$, one member of which is carried at one end of the spindle $f$ and the other member of which is carried at the free end of a shaft $e'$ projecting from the gear box $e$, the spindle $f$ is rotated at a desired predetermined speed from the gearing in box $e$.

Projecting at right angles to the shaft $e'$ from the gear box $e$, is a second shaft $e^2$ carrying at its free end a gear wheel $q$ in mesh with a fixed gear ring $p$ surrounding the hollow shaft $k$ of the head stock.

Secured to or formed integrally with the nut $a'$ is a laterally projecting rack $g$ adapted to mesh with the teeth $h$ formed exteriorly on a hub or sleeve $i$ which is mounted in grooves on the outer periphery of the shaft $k$ (Fig. 2). The hub $i$ is revoluble but not axially movable. The hub $i$ is also internally threaded and designed to mesh with threads formed on one end of a shaft or rod $l$ which is axially movable in a groove $l'$ formed on the outer periphery of the shaft $k$. The rod $l$ is positively connected to a ring $m$ which surrounds shaft $k$. The shaft $k$ is rotated from any suitable source, such as the electrode motor $d$, from which a belt $d'$ passes over the pulley $d^2$, and by suitable intermediate gearing not necessary to be shown in detail, causes rotation of the shaft $k$. C is a rheostat carrying the motor switch $o$, and $n$ is a fork connected to the motor switch and between the tines of which the ring $m$ projects. 17 are ducts through which excess lubricant passes to the pan 18.

The operation of the form of invention above described is as follows:—When the motor $d$ has been started, the shaft $k$ is caused to revolve, whereby the cutter head $b$ rotates, and the gear wheel $q$ revolves about the fixed gear ring $p$. Owing to revolution of the gear wheel $q$, the gearing in box $e$ will revolve at the predetermined speed, and through the bevel gearing $r$ revolve the screw spindle $f$ at a corresponding speed. The nut $a'$ (on which the cutter carriage $a$ is mounted) will travel along the spindle $f$, and by this action the rack bar $g$ meshing with the gear teeth $h$ will revolve the sleeve $i$ at a speed corresponding to the speed of travel of the nut $a'$ and the cutter carriage $a$. The revolution of the sleeve $i$ will cause axial movement of the rod $l$ to an extent and at a speed dependent upon the speed and extent of the traversing or feeding movement of the carriage $a$ in the cutter head $b$. Inasmuch as the rod $l$ is connected to the ring $m$, and the latter is positioned to engage the fork $n$ of the switch lever $o$, it is obvious that when rod $l$ is axially moved the switch $o$ will be correspondingly moved and the speed of the motor $d$ will be accelerated to a degree necessary to keep the cutting speed of the tool $a^5$ constant throughout the cutting operation. After completion of the work, the carriage $a$ returns to initial position, whereby the switch $o$ is also returned to initial position and the motor $d$ is then stopped. It will, of course, be readily understood that the action of the rod $l$ may be transmitted to any means, other than an electric motor, for causing actuation of the shaft $k$.

I will now describe the construction of the form of invention shown in Fig. 5, from which I have omitted, for the sake of clearness, the motor or other head stock actuating means, and connections from the latter to the headstock shaft.

The hollow shaft of the head stock is designated $k$ and carries a cutter head $b$ in which a plurality of cutter carriages $a$ is mounted, each being designed to travel along a separate screw spindle $f$, driven at suitable predetermined speeds through the intermediary of the bevel gear wheels $r$. Embracing the shaft $k$ are several gear rings $s$ of different size, three such rings being shown in the drawing. Mounted loosely on a shaft $t'$ are three gear wheels $t$ of different size, capable of being thrown into and out of mesh with the gears $s$, and forming with the latter the change speed gearing by means of which the carriages $a$ may be caused to traverse the head $b$ at different speeds. The gears $t$ may be driven by means of a gear wheel $u$ which is capable of being coupled to the machine frame by a coupling $v$, in order that the carriages $a$ may be returned to initial position, as more fully hereinafter described. The gear wheel $u$ meshes with the gear teeth $w$ formed about the periphery of a sleeve $x$ loosely held on the shaft $k$ between collars $x'$. Spaced from the gear teeth $w$ is a second row of gear teeth $y$ on the sleeve $x$, and meshing into the gear teeth $y$ are the spur gear wheels $z$, each carried at one end of a stud shaft $z^2$ to the opposite end of which one of the bevel wheels $r$, forming the gearing for turning the screw spindles $f$, is secured. It will be understood that, as shown in Fig. 5, a separate gear wheel $z$ is provided for each of the carriages $a$.

If the headstock be rotated with the gears $s$ and $t$ out of mesh and the gear wheel $u$ in its intermediate position as shown in the drawing, the sleeve $x$ will be rotated with the shaft $k$, owing to the meshing of the gears $z$ with the gear teeth $y$, and because the load on the gears $z$ is greater than that on the sleeve $x$. Under these conditions, obviously, there will be no feeding or traversing movement of the carriages $a$.

Meshing with the gear teeth $w$ is a gear wheel 2 equal in diameter to $w$ and mounted at one end of a shaft $2^a$, the other end of which carries a bevel gear wheel 3, forming one of a train of intermediate bevel gear wheels 3, 4 and 5 inclosed by a gear housing 10. The wheel 5 is mounted at one end of a worm shaft 6, the worm 7 of which meshes with a suitably mounted worm wheel 8, carrying on its shaft $8^a$ a sheave $8^b$ over which a cord or chain 9 runs for the purpose of actuating the switch $o$ of the rheostat C, and by means of which the speed of the motor (not shown in this view) is governed. It will be noted, from the construction described, that the rotation of the gear wheel 2 will be transmitted to the shaft 6 through the gear train 3, 4, 5, only if for example the gears $s$ and $t$ are in mesh and the movement of the sleeve $x$ is thus faster or slower than that of the shaft $k$.

To render the rotary action of the wheel 2 ineffectual under the condition stated, the middle bevel wheel 4 is mounted on a stud $4^a$ held in the casing 10 and by means of spur gearing 11, 12, 13 extending from the shaft 6 to the shaft $k$, the latter rotates the casing 10 in a direction opposite the direction of rotation of the wheels 2 and 3 and at a speed equal to the speed of rotation of shaft $k$. In this manner the bevel wheel 4 is rotated about its own axis, and by rotation of the casing 10, is rotated around the axes of the wheels 3 and 5. The latter movement renders ineffectual the rotative effort which the wheel 4 would otherwise exert on the wheel 3 if the sleeve $x$ were rotated relatively to the shaft $k$. If there be such relative rotation of the sleeve $x$, as for example by the meshing of the wheels $s$ and $t$, it would result in a feeding movement of the carriages $a$ as well as actuation of the worm gearing 7, 8. The work piece $z'$ is held properly centered in the shaft $k$ by means of screws 19.

The operation of the form of invention illustrated in Fig. 5 is as follows:—If the motor be started and the wheels $s$ and $t$ are in mesh, the sleeve $x$ is rotated relatively to the rotating shaft $k$, and this movement is transmitted to the gear wheels $z$ and 2. The wheels $z$, by their rotation of the bevel gear wheels $r$ and the spindles $f$, cause a feeding movement of the carriages *a* at appropriate speed. The wheel 2 is actuated at a like speed, causing the worm gearing 7, 8 to become operative and move the switch *o* to a position where the speed of the driving motor (not shown) will be accelerated to the desired extent. This motor acceleration will naturally result in accelerating the rotary speed of the shaft *k*, so that the cutting speed of the cutting tools is constant throughout the operation of the machine. If the wheel *u* and the gearing *s* and *t* be uncoupled, the carriages *a* and the shaft 6 stop, owing to the arrangement and operation of the gears 3, 4, 5, and 11, 12, 13, above described. In this manner it is also possible, by suitable crank means, to stop manually from the shaft 6, the action of the carriages *a* when the cutter head is rotating. It is also desirable to automatically disengage the gears *t* from the gears *s* upon completion of the cutting work, and to this end I provide on the worm wheel 8 an abutment 8ᶜ adapted to reverse a lever 14 suitably connected by the links 15 and 16 with a forked arm 16ᵃ which straddles the gear wheel *u*. When the abutment 8ᶜ acts against the lever 14, the links 15 and 16 move the wheel *u* axially, disengaging the wheels *t* from the wheels *s*. For the purpose of reverse movement, the wheel *u* is clutched at *v* to the machine frame thus being held stationary, and causing reverse rotation of the sleeve *x* and the parts whose movement is dependent thereon.

Having thus described my invention, what I claim as new and desire to secure by Letters Patent is:—

1. A lathe comprising a rotary cutter head, a cutting tool having a traversing movement in said cutter head, and means whereby the rotary speed of said cutter head is automatically varied to maintain the cutting speed of said tool constant.

2. A lathe comprising a rotary cutter head, a cutting tool adapted to have a traversing movement in said cutter head, and means governed by the traversing movement of said tool for controlling the speed of rotation of said cutter head to maintain the cutting speed of the tool constant.

3. A lathe comprising a cutter head, a motor for rotating the same, a cutting tool adapted to have a traversing movement in said cutter head, and automatically operating means for controlling the speed of said motor to maintain the cutting speed of the tool constant.

4. A lathe comprising a cutter head, a motor for rotating the same, a cutting tool adapted to have a traversing movement in said cutter head, and means governed by the traversing movement of said tool for automatically controlling the speed of said motor to maintain the cutting speed of the tool constant.

5. A lathe comprising a cutter head, a motor for rotating the same, a cutting tool having a traversing movement in said cutter head, a shaft interposed between said cutter head and said motor, and means adapted to act on said shaft to control the speed of the motor and maintain the cutting speed of said tool constant.

6. A lathe comprising a cutter head, a motor for rotating the same, a cutting tool having a traversing movement in said cutter head, a shaft interposed between said cutter head and said motor, and means controlled by the traversing movement of the tool in the cutter head and adapted to act on said shaft to control the speed of the motor and maintain the cutting speed of said tool constant.

7. A lathe comprising a cutter head, a screw spindle in said cutter head, a cutting tool adapted to travel along said spindle, means acting to simultaneously rotate said cutter head and cause movement of said cutting tool along said spindle, and automatically operating means whereby the speed of rotation of said cutter head is controlled to maintain the cutting speed of the tool constant.

8. A lathe comprising a cutter head, a screw spindle in said cutter head, a cutting tool adapted to travel along said spindle, means acting to simultaneously rotate said cutter head and cause movement of said cutting tool along said spindle, and automatically operating means actuated from said screw spindle whereby the speed of rotation of said cutter head is controlled to maintain the cutting speed of the tool constant.

9. A lathe comprising a cutter head, a motor for rotating the same, a cutting tool having a traversing movement in said cutter head, a shaft interposed between said cutter head and said motor, means near one end of said shaft for causing variations in speed of said motor, and means acting against the opposite end of said shaft for operating said first named means.

10. A lathe comprising a cutter head, means for rotating the same, a cutting tool in said cutter head, means for feeding said tool across said cutter head, and means whereby the rotary speed of said cutter is controlled from the means for feeding the tool.

11. A lathe comprising a rotary cutter head, a cutting tool carried thereby, gearing for feeding said cutting tool across said cutter head, and means driven from said gearing for automatically governing the rotary speed of the cutter head to maintain the cutting speed of the tool constant.

12. A lathe comprising a head-stock including a shaft and a cutter head carried thereby, a cutting tool carried by said cutter head, means for rotating said shaft and cutter head, means for imparting a traversing feeding movement to the tool in said cutter head, and means on said shaft for acting on said first named means to maintain the cutting speed of said tool constant.

In testimony whereof I have affixed my signature in presence of two witnesses.

HANS G. KRAUSS.

Witnesses:
   A. W. COTTLE,
   ARTHUR GUBE.